(12) United States Patent
Rich

(10) Patent No.: US 7,987,087 B2
(45) Date of Patent: Jul. 26, 2011

(54) METHOD AND SYSTEM FOR IMPROVED SOFTWARE LOCALIZATION

(75) Inventor: David P. Rich, Brockport, NY (US)

(73) Assignee: Xerox Corporation, Norwalk, CT (US)

( * ) Notice: Subject to any disclaimer, the term of this patent is extended or adjusted under 35 U.S.C. 154(b) by 1044 days.

(21) Appl. No.: 11/152,082

(22) Filed: Jun. 15, 2005

(65) Prior Publication Data

US 2006/0287844 A1    Dec. 21, 2006

(51) Int. Cl.
*G06F 17/28* (2006.01)
*G06F 17/20* (2006.01)
*G06F 17/27* (2006.01)

(52) U.S. Cl. .............. 704/2; 704/4; 704/7; 704/8; 704/9

(58) Field of Classification Search .................. 704/2, 3, 704/10, 277
See application file for complete search history.

(56) References Cited

U.S. PATENT DOCUMENTS

| | | | | |
|---|---|---|---|---|
| 5,088,038 A * | 2/1992 | Tanaka et al. ................... 704/2 |
| 5,642,522 A * | 6/1997 | Zaenen et al. ................. 715/246 |
| 5,678,039 A * | 10/1997 | Hinks et al. ...................... 707/4 |
| 6,269,189 B1 * | 7/2001 | Chanod ........................ 382/229 |
| 6,321,372 B1 * | 11/2001 | Poirier et al. ................. 717/122 |
| 6,345,244 B1 * | 2/2002 | Clark ............................... 704/2 |
| 6,393,389 B1 * | 5/2002 | Chanod et al. ................... 704/7 |
| 6,453,462 B1 * | 9/2002 | Meade et al. ................. 717/124 |
| 7,110,937 B1 * | 9/2006 | Lei et al. ........................ 704/2 |
| 7,110,938 B1 * | 9/2006 | Cheng et al. .................... 704/5 |
| 7,509,251 B2 * | 3/2009 | Andrews et al. ................ 704/8 |
| 7,761,288 B2 * | 7/2010 | Parnell et al. ................... 704/2 |
| 2003/0154071 A1 * | 8/2003 | Shreve ........................... 704/9 |
| 2004/0122652 A1 * | 6/2004 | Andrews et al. ................ 704/2 |
| 2005/0050526 A1 * | 3/2005 | Dahne-Steuber et al. .... 717/136 |
| 2005/0240393 A1 * | 10/2005 | Glosson ........................... 704/8 |

* cited by examiner

Primary Examiner — Richemond Dorvil
Assistant Examiner — Olujimi A Adesanya
(74) Attorney, Agent, or Firm — Matthew C. Loppnow; Prass LLP

(57) ABSTRACT

A method, system, and computer program for software localization extracts text from resource files, handles file management of the resource files, and uses a database for storage. A method for localizing software comprises extracting text strings in a first language from source files of a software development project, determining which of the extracted text strings are to be translated to a second language, generating and sending for translation a file including the text strings that are to be translated, receiving a file including text strings that have been translated to the second language, and reconstructing the source files of the software development project including text strings that have been translated to the second language.

20 Claims, 3 Drawing Sheets

METHOD AND SYSTEM FOR IMPROVED SOFTWARE LOCALIZATION

TECHNICAL FIELD

The present technology relates to a method and system for extracting and managing text appearing in software applications that is to be translated in order to localize the software applications.

BACKGROUND OF THE TECHNOLOGY

Many software applications and packages are distributed throughout the world. An important aspect of such distribution is that the software is localized to each country in which it is distributed. Localization is the process of adapting software for a particular country or region. For example, the software must support the character set of the local language and must be configured to present numbers and other values in the local format. In addition, text strings that are presented to the user of the software should be presented in the local language.

Software companies that wish to sell their software internationally must invest considerable money and energy in localization efforts. Typically, software is developed in a single language, then localization is performed on the software. One major cost is the translation of text strings from the original language in which the software is developed into a number of local languages. In addition to the cost, this translation is typically very time consuming. If software is developed in stages, it may be necessary to perform these translations at each stage, which may mean that the same text strings are being translated multiple times.

A need arises for a technique by which text strings in software may be translated as part of a localization of the software, but which provides reduced cost, improved efficiency, and quicker turnaround of the translation process.

SUMMARY OF THE TECHNOLOGY

A method, system, and computer program for software localization extracts text from resource files, handles file management of the resource files, and uses a database for storage. Once the strings are extracted from the original resource files, the strings and corresponding meta-data required for file reconstruction are processed and stored into a common database. Messages are identified as new, changed, or old (previously translated) based on their being found in the database during processing. Once processing is complete, a file used for translation that contains only the changed and new messages is generated. This file has a standardized format that is compatible with translation tools used by those performing the actual translations. Once the translations are completed, the translated file is sent to the database via the same web service. The original resource files are then automatically recreated, substituting the translated text for the source. The original resource files may also be regenerated using the original strings that have been lengthened (using a multinational character set) to what might be an appropriate length expected from any language. Padding characters may include Japanese, Chinese or any Unicode characters.

A method for localizing software comprises extracting text strings in a first language from source files of a software development project, determining which of the extracted text strings are to be translated to a second language, generating and sending for translation a file including the text strings that are to be translated, receiving a file including text strings that have been translated to the second language, and reconstructing the source files of the software development project including text strings that have been translated to the second language.

The source files of the software development project are resource files and the text strings are extracted from the resource files. The text strings are extracted from the resource files based on rules defining a resource file format specification and defining a file encoding for each local language. The rules comprise regular expressions defining the resource file format.

The method further comprises storing the extracted text strings in a database, each extracted text string stored in a database entry comprising the extracted text string and information indicating whether the text string is to be translated. The extracted text strings that to be translated to a second language are determined based on the information indicating whether the text string is to be translated. The received text strings that have been translated to the second language are stored in the database, each translated text string stored in a database entry comprising the corresponding extracted text string in the first language. The source files of the software development project are reconstructed using the information stored in the database.

The file including the text strings that are to be translated is generated in a format compatible with translation tools to be used.

The method further comprises generating at least one of a pseudo translation of the text strings, a count of a number of text strings to be translated, and a count of a number of words in the text strings to be translated.

BRIEF DESCRIPTION OF THE DRAWINGS

Objects and advantages of the technology described in the present disclosure will be more clearly understood when considered in conjunction with the accompanying drawings, in which.

DETAILED DESCRIPTION

Figure 1:
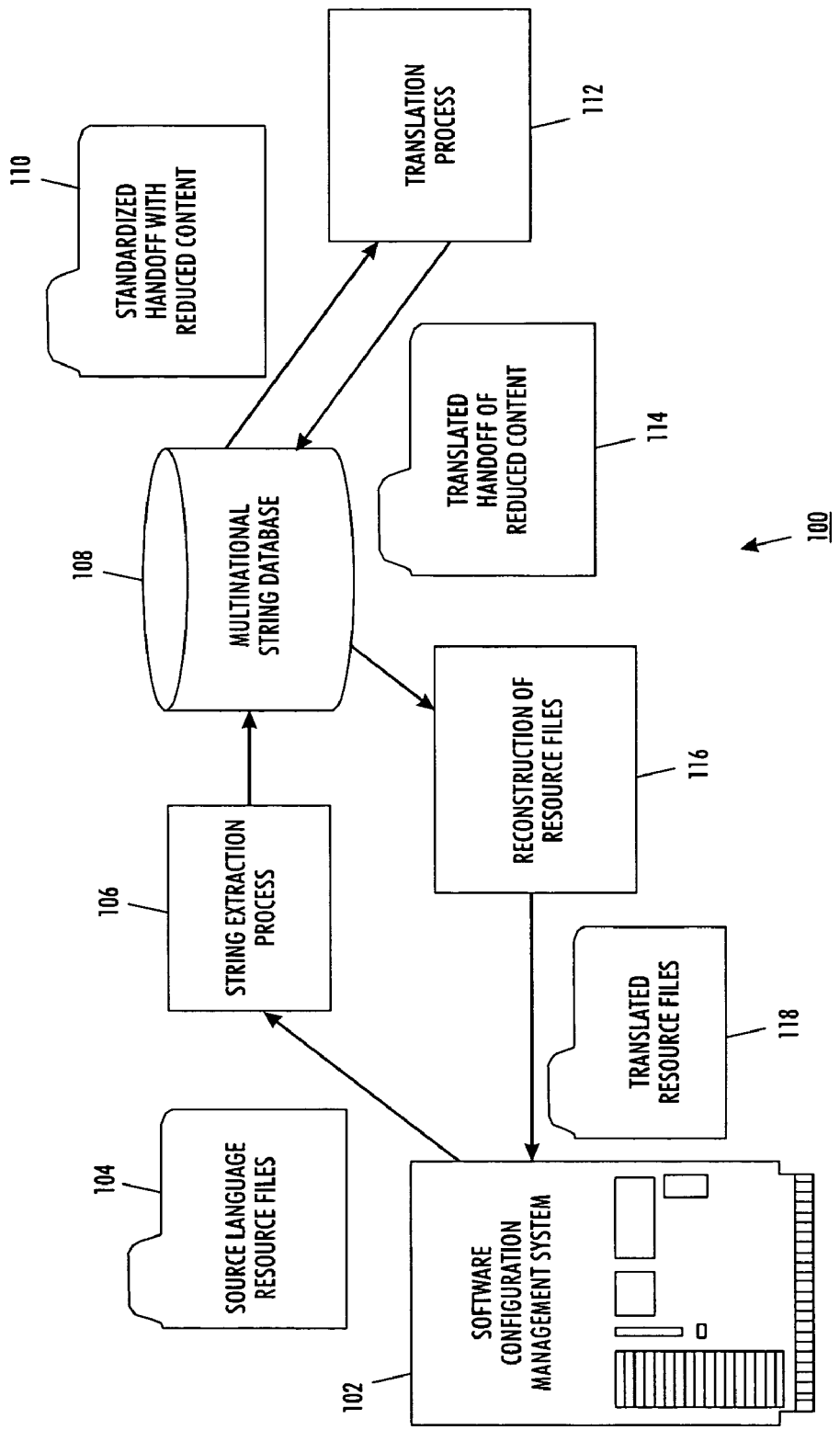
FIG. 1 is an exemplary block diagram of a system in which the technology described in the present disclosure may be implemented.
Figure 2:
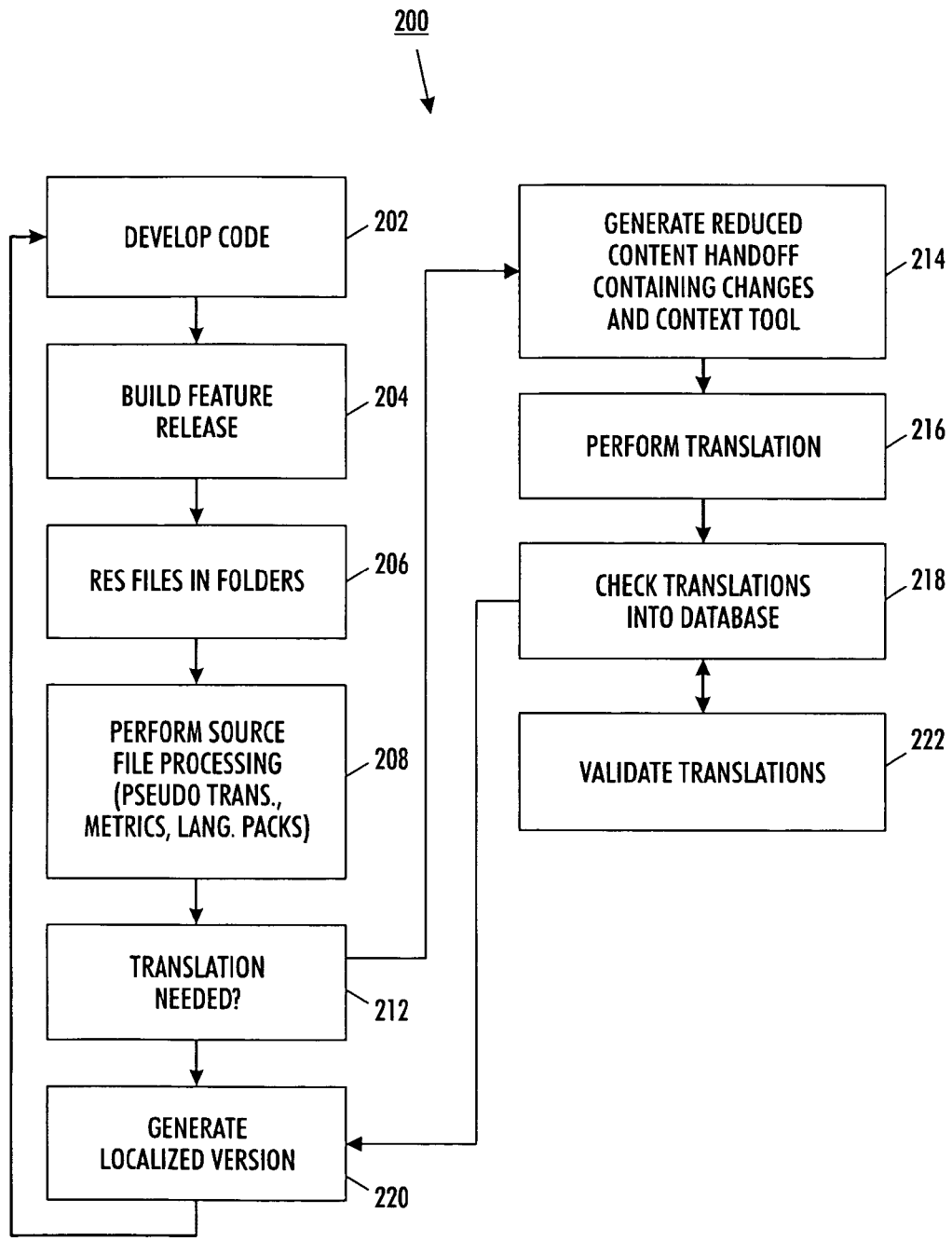
FIG. 2 is a flow diagram of a software localization process.

The present disclosure provides a technique for improved localization of software with automated handoff processing and standardized handoff formats. An example of this is shown in FIG. 1, which is a block diagram of a system 100 in which software localization processing may be performed. A process of software localization that may be implemented in system 100 is shown in FIG. 2. FIGS. 1 and 2 are best viewed in conjunction. Process 200 begins with step 202, in which source code for a software project is developed. Source code for software that is being developed is stored and controlled by software configuration management (SCM) system 102. SCM involves the management of security features and assurances through control of changes made to software, firmware, documentation, test procedures, and test documentation of a software system, throughout the development and operational life of the system. In particular, this involves the control of changes—including the recording thereof—that are made to the software, firmware, and documentation throughout the system lifecycle. SCM can be divided into two areas. One area of SCM concerns the storage of the entities produced during the software project, sometimes referred to as component repository management. The second area concerns the activities performed for the production and/or change of these entities; the term engineering support is often used to refer to this second area.

Among the source files stored on SCM system 102 are source language files 104. Source language files 104 typically include a plurality of resource files, and may also include other types of files, such as source code files, etc. Resource files are typically used to store structured data in a file, with each structure element being a resource in the file. For example, a software application may display a number of text strings in various screen displays, such as data entry displays, status displays, instruction displays, error messages, etc. In older software development, these text strings were typically embedded in the source code of the software application. In order to modify the text strings, the source code itself had to be modified, which required recompilation of the software and risked introducing programming errors in the software. In modern software, the text strings are stored in one or more resource files and are accessed by reference to a resource identifier. This provides the capability to modify the text strings by editing only the resource files, which is typically simpler and has a lower risk of introducing errors in the software. A further advantage of resource files is that, in order to localize the software, by translating the text strings to a local language, all the text strings to be translated are found in the resource files. Thus, only the resource files need be modified in order to localize the software; the source code files need not be involved.

However, the resource files of a software application include data other than text strings to be translated for localization. For example, the resource files may include screen display layouts, images to be displayed, audio, and/or video to be played, etc. Typically, a resource file includes the resource data, such as the text string, etc., and associated resource metadata, which includes information that describes characteristics of the resource data, such as the text string length, text string language, etc. The format of the resource file may vary depending upon the software development system used, the operating system on which the software development system runs, the target operating system for the software, etc.

In step 204, a feature release of the software is built. In the software build, the programming code is compiled and linked, the resources are integrated with the programming code, and an executable package of files is generated. In addition, in step 206, the resource files that are part of the source language files are organized. In a typical large software project, there may be hundreds of resource files. Typically, these are organized in a number of folders associated with, or corresponding to, the programming code files.

In step 208, source file processing is performed. Source file processing includes extraction of the text strings from the resource files 104 by string extraction process 106. String extraction process 106 extracts the text strings from resource files 104 and then the extracted text strings are stored in multinational string database 108. Database 108 includes all extracted source language text strings, as well as all currently available local language text strings, which are translations of the source languages text strings.

Source file processing may include two modes of processing—baseline processing and insert processing. In baseline processing, all source language text strings in the resource files are extracted and entered into database 108. As the name implies, this provides a baseline, known state for the localization process. Insert processing involves extraction and/or entry of new and modified text strings into database 108. For example, the extracted source language text strings may be stored in database 108 based on an identifier. Likewise, the identifier may include information indicating the software project, the file path, the software key, and the instance of each source language text string.

When insert mode processing is performed, each newly extracted source language text string is compared to the currently stored source language text string for the same resource or string identifier. If the newly extracted text string is identical to the stored text string, then no modification has occurred (old string) and any stored local language translations for that resource or string identifier are still valid. In this case, the string does not need to be re-translated and this status is indicated in database 108. If the newly extracted text string has been modified relative to the stored text string (changed string), or if there is no stored text string for that resource or string identifier (new string), then the newly extracted text string is stored, and a translation or a new translation is required. This status is likewise indicated in database 108. For example, to insert a new string into database 108, a new message identifier is created, text prior to the string is inserted into a preamble field of the database entry, the translatable flags are set appropriately, and the desired localized file encodings are set based on the locale.

String extraction process 106 accepts resource files in any known format and outputs the extracted text strings in a single file having a standardized format. This format decoding and encoding may be performed by special purpose decoding and encoding software developed for each file format. However, this format decoding and encoding may be performed by generic decoding and encoding software that is controlled by decoding and encoding rules for file format. These rules may define the input resource file format specification and the input/output file encoding for each local language to be output. The rules may have any suitable format, such as regular expressions defining the resource file format. A regular expression is a string that describes or matches a set of criteria, according to certain syntax rules. Regular expressions are used by many text editors and utilities to search and manipulate bodies of text based on certain patterns. The regular expressions defining the rules used in string extraction process 106 may identify the software key and string, as well as the text encoding.

Strings may be indicated in the resource files as being non-translatable. For example, where text strings must be displayed without alteration due to copyright, contractual, or standards obligations, the strings should be indicated as being non-translatable. This may be accomplished by a number of techniques, such as placing non-translatable strings in separate resource files from translatable strings, marking the non-translatable strings with instructions, symbols, etc. indicating that they are non-translatable, maintaining a list of non-translatable strings, etc. Strings that are indicated as non-translatable are omitted from the file of strings to be translated that is output from step 214.

Additional processing may also be performed. For example, a pseudo translation of the text strings may be generated. A pseudo translation may be used to estimate the worst-case (longest) length of a text string once it is translated, without actually translating the string. A pseudo translation may be formed by padding the text string with multinational characters in order to estimate the worst-case length. This technique may be performed without using database 108 and provides a reasonable estimate of the worst-case length. If some local language translations have already been performed and stored in database 108, then the worst-case lengths may be determined based on the lengths of the longest translations stored for each string in database 108. In this embodiment, the lengths of the longest translations stored for each string in database 108 may be used as is, or the lengths may be adjusted, such as by increasing the lengths by some percentage.

Metrics may be calculated based on the status (new, changed, old) of the text strings. In particular, counts of the number of words and the number of strings that are to be translated may be calculated. These counts may then be used to obtain accurate estimates of the costs of performing a translation at any given point in the development process.

When it is time to have the translations of the source language text strings prepared for a particular local language, in step 214 a handoff file 110 having a standardized format and a reduced content is generated. The standardized format is a format that is compatible with translation tools used in translation process 112. The standardized format eliminates issues that may arise due to the various formats that the resource files 104 may have. The format typically includes the source language text strings and metadata associated with each string, such as resource or string identifiers, language identifiers, etc. For example, handoff file 110 may be formatted as a standard Translation Memory Exchange (TMX) file, which uses Extended Markup Language (XML) statements. The reduced content is generated by including only those text strings for which a translation or a new translation is required. For example, only one handoff file may be generated for each local language regardless of the number of resource files in the software project that include text strings. The text strings from all such resource files are combined to form the single handoff file. In addition, when a handoff file 110 is generated, database 108 is updated to indicate this status.

In step 216, handoff file 110 is transmitted to translation process 112 and translation is performed. Translation process 112 may be any type of translation process, such as a manual translation, a computer assisted manual translation, an automated translation, a partially manual and partially automated translation, etc. Handoff file 110 is in a standardized format, so it is compatible with the translation tools used in translation process 112. Translation process 112 generates a translated handoff file 114, which typically has a format similar to the format of handoff file 110. Translated handoff file 114 typically includes the local language text strings and metadata associated with each string, such as resource or string identifiers, language identifiers, etc., and may include the original source language text strings that were included in handoff file 110.

In step 218, the information content in translated handoff file 114 is checked into database 108. In particular, the local language text strings are stored in association with the source language text strings based on the resource or string identifier associated with the local language text strings and the source language text strings. Once the translated content has been stored in database 108, the translated content may, at any time, be extracted for use, in step 220, in generating a localized version of the software being developed.

In step 222, the translations are validated and again checked into database 108.

When it is desired to generate a localized version of the software, in step 220, a process of reconstruction of the resource files 116 is performed. Process 116 accesses the translated strings stored in database 108 and the source language resource files 104, replaces the source language text strings in the resource files with the corresponding translated text strings, and generates translated resource files 118. For example, for each language variant, the preamble of each string entry in database 108 are extracted and the selected localized string is concatenated with the matching message identifier. New messages are inserted into database 108, creating new message identifiers. The file encoding is configurable based on the file and the locale. Translated resource files 118 are then stored on SCM system 102, so that localized versions of the software being developed can be built.

Figure 3:
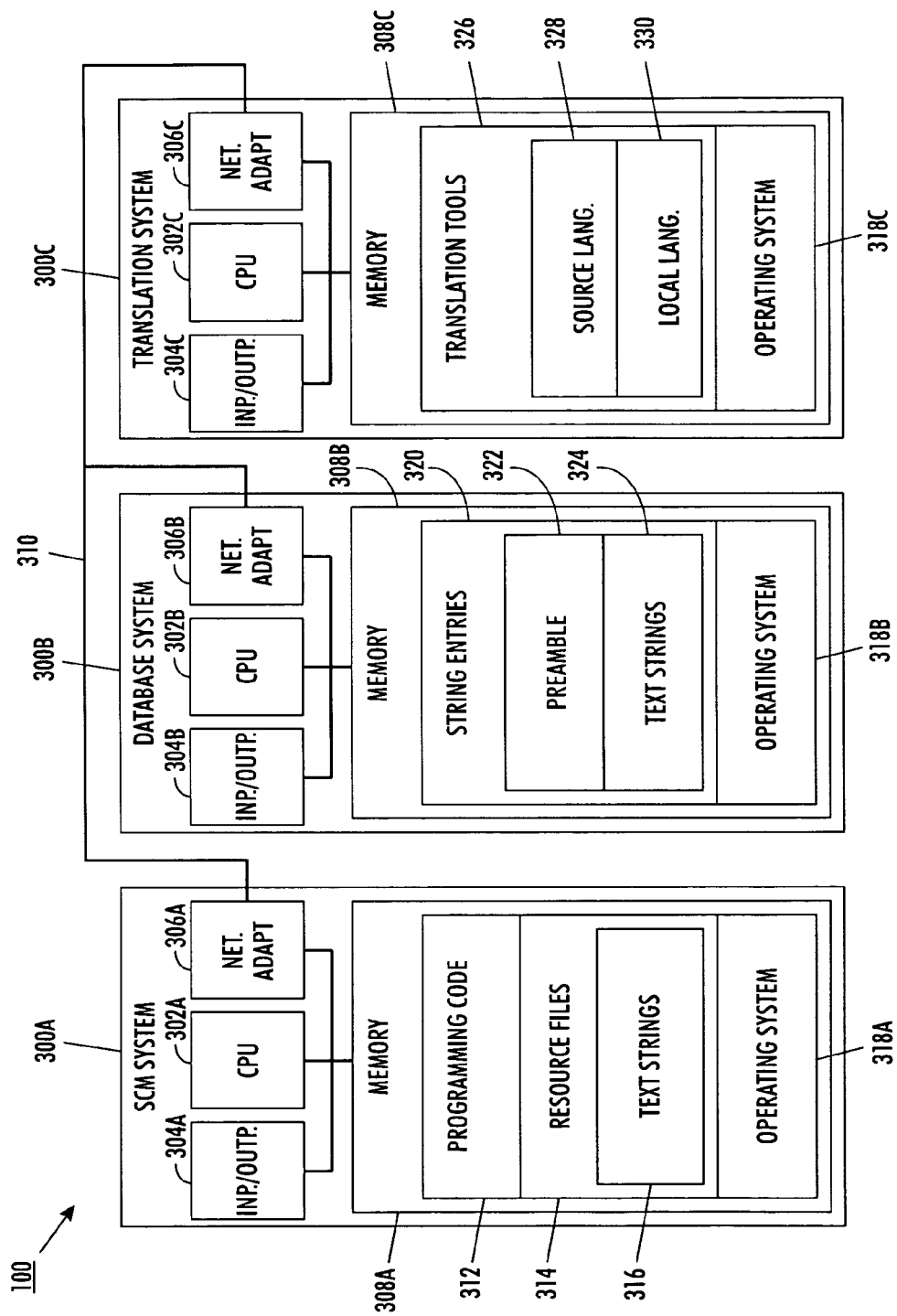
FIG. 3 is an exemplary block diagram of a system in which the technology described in the present disclosure may be implemented.

An exemplary block diagram of a software development system 100, in which the present technology may be implemented, is shown in FIG. 3. System 100 includes a plurality of systems, such as SCM system 300A, database system 300B, and translation system 300C. Each system 300A-C is typically a programmed general-purpose computer system, such as a personal computer, workstation, server system, and minicomputer or mainframe computer. Each system 300A-C includes one or more processors (CPUs) 302A-C, input/output circuitry 304A-C, network adapter 306A-C, and memory 308A-C. CPUs 302A-C execute program instructions in order to carry out the functions of the present technology. Typically, CPUs 302A-C are one or more microprocessors, such as an INTEL PENTIUM® processor. FIG. 3 illustrates an embodiment in which each system 300A-C is implemented as a single computer system, each of which may include one or more CPUs 302A-C. However, the present technology also contemplates embodiments in which each system 300A-C is implemented as a plurality of networked computer systems, which may be single-processor computer systems, multi-processor computer systems, or a mix thereof.

Input/output circuitry 304A-C provides the capability to input data to, or output data from, its respective system 300A-C. For example, input/output circuitry may include input devices, such as keyboards, mice, touchpads, trackballs, scanners, etc., output devices, such as video adapters, monitors, printers, etc., and input/output devices, such as, modems, etc. Network adapter 306A-C interfaces its respective system 300A-C with network 310. Network 310 may include one or more standard local area network (LAN) or wide area network (WAN), such as Ethernet, Token Ring, the Internet, or a private or proprietary LAN/WAN.

Each memory 308A-C stores program instructions that are executed by, and data that are used and processed by, each CPU 302A-C to perform the functions of each system 300A-C. Each memory 308A-C may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), Serial ATA, Firewire (IEEE 1394), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 3, SCM system 300A includes memory 308A, which includes programming code 312, resource files 314, which include text strings 316, and operating system 318A. Programming code 312 includes the source code that defines the operations that are to be performed by the software. Resource files 314 include the resource data, such as the text strings 316, etc., and associated resource metadata, which includes information that describes characteristics of the resource data, such as the text string length, text string language, etc. Operating system 318A provides overall system functionality.

In the example shown in FIG. 3, database system 300B includes memory 308B, which includes string entries 320 and operating system 318B. String entries 320 are database entries representing text strings 316 that have been stored in database system 300B. Each string entry 320 includes a preamble 322 and text strings 324. The preamble 322 for an entry includes all of the data that occurs in the original resource file since the end of the previous string. Such information may include identifiers for each text string, translation status of each text string, etc. The identifier may include information indicating the software project, the file path, the software key, and the instance of each source language text string. Operating system 318B provides overall system functionality.

In the example shown in FIG. 3, translation system 300C includes memory 308C, which includes translation tools 326 and operating system 318C. Translation tools 326 are tools that provide the capability to translate provided text strings. Translation tools may support any type of translation process, such as a manual translation, a computer assisted manual translation, an automated translation, a partially manual and partially automated translation, etc. Typical translation tools include storage for source language text strings 328 and storage for corresponding local language text strings 330. Operating system 318B provides overall system functionality.

Although SCM system 300A, database system 300B, and translation system 300C are shown together as parts of system 100, each system may actually be provided by and operated by different entities. For example, translation system is typically provided by and operated by a translation vendor that is a separate entity than the software developer that provides and operates SCM system 300A. Likewise, database system 300B may be provided and operated by either of these entities or by another entity, such as a localization support organization. The present technology contemplates any and all such entities that may provide and/or operate the described systems.

As shown in FIG. 3, the present technology contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

Although specific embodiments of the present technology have been described, it will be understood by those of skill in the art that there are other embodiments that are equivalent to the described embodiments. Accordingly, it is to be understood that the technology is not to be limited by the specific illustrated embodiments, but only by the scope of the appended claims.

The invention claimed is:

1. A method for localizing software comprising:
   extracting text strings in a first language from source files of a software development project that require translation;
   generating a pseudo translation of the extracted text strings by padding the extracted text strings with multinational characters to estimate a worst case length of the text string once it is translated;
   associating a string identifier with each extracted text string;
   determining which of the extracted text strings are to be translated to a second language by comparing each extracted text string to a previously stored version of the same extracted text string having the identifier and by determining which text strings are old text strings as being identical to the previously stored version of the same extracted text string;
   indicating the old text string with a status indicating the old text string does not need to be re-translated;
   generating and sending for translation one handoff file for all of the source files of the software development project that require translation, the handoff file including the text strings that are to be translated while excluding old text strings based on the status indicating the old text strings do not need to be re-translated;
   receiving a translated handoff file including translated text strings that have been translated to the second language from the handoff file, the translated handoff file also including a translated text string identifier associated with each translated text string;
   storing the translated text strings in association with the extracted text strings based on the identifier associated with each translated text string and based on the string identifier associated with each extracted text string; and
   reconstructing the source files of the software development project including text strings that have been translated to the second language by replacing source file text strings with corresponding translated text strings.

2. The method of claim 1, wherein the source files of the software development project are resource files and the text strings are extracted from the resource files.

3. The method of claim 2, wherein the text strings are extracted from the resource files based on rules defining a resource file format specification and defining a file encoding for each local language.

4. The method of claim 3, wherein the rules comprise regular expressions defining the resource file format.

5. The method of claim 1, further comprising storing the extracted text strings in a database, each extracted text string stored in a database entry comprising the extracted text string and information indicating whether the text string is to be translated.

6. The method of claim 5, wherein the extracted text strings that are to be translated to a second language are determined based on the information indicating whether the text string is to be translated.

7. The method of claim 5, wherein the received text strings that have been translated to the second language are stored in the database, each translated text string stored in a database entry comprising the corresponding extracted text string in the first language.

8. The method of claim 7, wherein the source files of the software development project are reconstructed using the information stored in the database.

9. The method of claim 1, wherein the handoff file including the text strings that are to be translated is generated in a format compatible with translation tools to be used.

10. The method of claim 1, further comprising generating at least one of: a count of a number of text strings to be translated and a count of a number of words in the text strings to be translated.

11. A system for localizing software comprising:
a processor operable to execute computer program instructions; a memory operable to store computer program instructions executable by the processor; and
computer program instructions stored in the memory and executable to perform the steps of: extracting text strings in a first language from source files of a software development project that require translation; generating a pseudo translation of the extracted text strings by padding the extracted text strings with multinational characters to estimate a worst case length of the text string once it is translated; determining which of the extracted text strings are to be translated to a second language by comparing each of the extracted text strings to a previously stored version of the same extracted text string having the identifier and by determining which text strings are old text strings as being identical to the previously stored version of the same extracted text string; indicating the old text string with a status indicating the old text string does not need to be re-translated; generating and sending for translation one handoff file for all of the source files of the software development project that require translation, the handoff file including the text strings that are to be translated while excluding old text strings based on the status indicating the old text strings do not need to be re-translated; receiving a translated handoff file including translated text strings that have been translated to the second language from the handoff file, the translated handoff file also including a translated text string identifier associated with each translated text string; storing the translated text strings in association with the extracted text strings based on the identifier associated with each translated text string and based on the string identifier associated with each extracted text string; and reconstructing the source files of the software development project including text strings that have been translated to the second language by replacing source file text strings with corresponding translated text strings.

12. The system of claim 11, wherein the source files of the software development project are resource files and the text strings are extracted from the resource files, wherein the text strings are extracted from the resource files based on rules defining a resource file format specification and defining a file encoding for each local language, and wherein the rules comprise regular expressions defining the resource file format.

13. The system of claim 11, further comprising storing the extracted text strings in a database, each extracted text string stored in a database entry comprising the extracted text string and information indicating whether the text string is to be translated and wherein the extracted text strings that are to be translated to a second language are determined based on the information indicating whether the text string is to be translated.

14. The system of claim 11, further comprising storing the extracted text strings in a database, each extracted text string stored in a database entry comprising the extracted text string and information indicating whether the text string is to be translated, wherein the received text strings that have been translated to the second language are stored in the database, each translated text string stored in a database entry comprising the corresponding extracted text string in the first language and wherein the source files of the software development project are reconstructed using the information stored in the database.

15. The system of claim 11, wherein the handoff file including the text strings that are to be translated is generated in a format compatible with translation tools to be used.

16. A non-transitory computer readable medium for localizing software comprising:
computer program instructions, recorded on the non-transitory computer readable medium, executable by a processor, for performing the steps of: extracting text strings in a first language from source files of a software development project that require translation; generating a pseudo translation of the extracted text strings by padding the extracted text strings with multinational characters to estimate a worst case length of the text string once it is translated; determining which of the extracted text strings are to be translated to a second language by comparing each of the extracted text strings to a previously stored version of the same extracted text string having the identifier and by determining which text strings are old text strings as being identical to the previously stored version of the same extracted text string; indicating the old text string with a status indicating the old text string does not need to be re-translated; generating and sending for translation one handoff file for all of the source files of the software development project that require translation, the handoff file including the text strings that are to be translated while excluding old text strings based on the status indicating the old text strings do not need to be re-translated; receiving a translated file including translated text strings that have been translated to the second language from the handoff file, the translated handoff file also including a translated text string identifier associated with each translated text string; storing the translated text strings in association with the extracted text strings based on the identifier associated with each translated text string and based on the string identifier associated with each extracted text string; and reconstructing the source files of the software development project including text strings that have been translated to the second language by replacing source file text strings with corresponding translated text strings.

17. The non-transitory computer readable medium of claim 16, wherein the source files of the software development project are resource files and the text strings are extracted from the resource files, wherein the text strings are extracted from the resource files based on rules defining a resource file format specification and defining a file encoding for each local language, and wherein the rules comprise regular expressions defining the resource file format.

18. The non-transitory computer readable medium of claim 16, further comprising storing the extracted text strings in a database, each extracted text string stored in a database entry comprising the extracted text string and information indicating whether the text string is to be translated and wherein the extracted text strings that are to be translated to a second language are determined based on the information indicating whether the text string is to be translated.

19. The non-transitory computer readable medium of claim 16, further comprising storing the extracted text strings in a database, each extracted text string stored in a database entry comprising the extracted text string and information indicating whether the text string is to be translated, wherein the received text strings that have been translated to the second language are stored in the database, each translated text string stored in a database entry comprising the corresponding extracted text string in the first language and wherein the source files of the software development project are reconstructed using the information stored in the database.

20. The method of claim 1, further comprising obtaining an estimate of a cost of performing a translation of the pseudo translation of the extracted text strings.

* * * * *